(12) United States Patent
Ogata (10) Patent No.: US 10,722,877 B2
(45) Date of Patent: Jul. 28, 2020

(54) HONEYCOMB STRUCTURE (71) Applicant: NGK INSULATORS, LTD., Nagoya (JP)

(72) Inventor: Takayuki Ogata, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 316 days.

(21) Appl. No.: 15/921,927

(22) Filed: Mar. 15, 2018

(65) Prior Publication Data

US 2018/0280958 A1 Oct. 4, 2018

(30) Foreign Application Priority Data

Mar. 30, 2017 (JP) ................. 2017-068314

(51) Int. Cl.
*B01J 35/04* (2006.01)
*B01D 46/24* (2006.01)
*C04B 38/00* (2006.01)
*F01N 3/28* (2006.01)

(52) U.S. Cl.
CPC ............ *B01J 35/04* (2013.01); *B01D 46/247* (2013.01); *B01D 46/2429* (2013.01); *B01D 46/2474* (2013.01); *C04B 38/0009* (2013.01); *F01N 3/2828* (2013.01); *B01D 2046/2433* (2013.01); *B01D 2046/2481* (2013.01); *B01D 2046/2492* (2013.01); *B01D 2046/2496* (2013.01); *F01N 2330/34* (2013.01); *F01N 2330/38* (2013.01)

(58) Field of Classification Search
None
See application file for complete search history.

(56) References Cited

U.S. PATENT DOCUMENTS

| 4,740,408 A * | 4/1988 | Mochida | B01D 46/10 |
| | | | 422/179 |
| 4,767,309 A * | 8/1988 | Mizuno | B28B 3/269 |
| | | | 264/177.11 |
| 2002/0045541 A1* | 4/2002 | Koike | B01J 35/04 |
| | | | 502/251 |
| 2014/0154145 A1* | 6/2014 | Aoki | B01J 35/0006 |
| | | | 422/180 |
| 2016/0160720 A1* | 6/2016 | Sadaoka | F01N 3/0222 |
| | | | 55/523 |
| 2017/0065919 A1* | 3/2017 | Yamanishi | B28B 11/006 |

FOREIGN PATENT DOCUMENTS

JP S62-266298 A1 11/1987

* cited by examiner

*Primary Examiner* — David Sample
*Assistant Examiner* — Elizabeth Collister
(74) *Attorney, Agent, or Firm* — Burr & Brown, PLLC (57) ABSTRACT

A honeycomb structure includes a pillar-shaped honeycomb structure body having porous partition walls, wherein the partition walls have projecting portions, the projecting portions include specific projecting portions in which side surfaces have a divergent shape inclined at an inclination angle of 40 to 70°, a relation of 0.04≤H/A≤0.40 is satisfied, a relation of 0.04≤$H_1$/A≤0.38 is satisfied, the height H of the specific projecting portion and the height $H_1$ of the hem satisfy a relation of $H_1$<H, and a ratio of a total number of the specific projecting portions is 2.5% or more.

4 Claims, 4 Drawing Sheets

HONEYCOMB STRUCTURE

The present application is an application based on JP-2017-068314 filed on Mar. 30, 2017 with Japan Patent Office, the entire contents of which are incorporated herein by reference.

BACKGROUND OF THE INVENTION

Field of the Invention

The present invention relates to a honeycomb structure, and more particularly, it relates to a honeycomb structure which is especially suitably utilizable as a catalyst carrier onto which a gas purifying catalyst is to be loaded.

Description of the Related Art

In recent years, awareness toward environmental problems has increased in the whole world. Consequently, in fields of technologies in which fuel is burnt to generate power, various technologies have been developed to remove toxic components such as nitrogen oxides from exhaust gases generated during the burning of the fuel. In other words, as various technologies of removing the toxic components, for example, there have been developed various technologies of removing toxic components such as nitrogen oxides from exhaust gases to be emitted from car engines. When the toxic components in the exhaust gases are removed, it is general to cause a chemical reaction in such a toxic component by use of a catalyst, thereby changing the component to another comparatively harmless component. Furthermore, as a catalyst carrier onto which an exhaust gas purifying catalyst is to be loaded, a honeycomb structure is used.

Heretofore, as this honeycomb structure, there has been suggested a honeycomb structure including a honeycomb structure body having porous partition walls which define a plurality of cells to form through channels for a fluid. As the honeycomb structure, for the purpose of increasing a geometric surface area of partition walls, there has been suggested a honeycomb structure including fins which project inwardly from the partition walls (e.g., see Patent Document 1).

[Patent Document 1] JP-A-S62-266298

SUMMARY OF THE INVENTION

In such a honeycomb structure as disclosed in Patent Document 1, a geometric surface area of partition walls can be increased by fins disposed on the partition walls. However, in the honeycomb structure of Patent Document 1, a catalyst is easy to accumulate in roots of the fins, and the catalyst accumulated in the roots is not sufficiently utilized. Specifically, according to the honeycomb structure of Patent Document 1, there is an unused catalyst, and an amount of the catalyst to be loaded is larger than an amount of the catalyst to be required for a purification performance of the catalyst. In other words, the honeycomb structure of Patent Document 1 has a situation in which there is the unused catalyst and the catalyst is not effectively utilized.

The present invention has been developed in view of such problems of conventional technologies. According to the present invention, there is provided a honeycomb structure which is especially suitably utilizable as a catalyst carrier onto which an exhaust gas purifying catalyst is to be loaded. There is provided the honeycomb structure which effectively utilizes the loaded catalyst, has a suitable purification performance, and inhibits increase of pressure loss.

According to the present invention, there is provided a honeycomb structure as follows.

[1] A honeycomb structure including a pillar-shaped honeycomb structure body having porous partition walls arranged to define a plurality of cells extending from a first end face to a second end face to form through channels for a fluid, and a circumferential wall disposed to surround the partition walls, wherein the partition walls have projecting portions projecting to extend into the cells and arranged continuously in an extending direction of the cells, the projecting portions include specific projecting portions in which side surfaces have a divergent shape inclined to the surfaces of the partition walls at an inclination angle of 40 to 70°, a hydraulic diameter A of each cell and a height H of each specific projecting portion satisfy a relation of $0.04 \leq H/A \leq 0.40$, in the specific projecting portion, the hydraulic diameter A of the cell and a height $H_1$ of a hem that is a portion having the divergent shape satisfy a relation of $0.04 \leq H_1/A \leq 0.38$, the height H of the specific projecting portion and the height $H_1$ of the hem satisfy a relation of $H_1 < H$, and a ratio of a total number of the specific projecting portions to a total number of all the projecting portions in the honeycomb structure body is 2.5% or more.

[2] The honeycomb structure according to the above [1], wherein the projecting portion includes a corner having a curvature radius R of 0.01 to 0.1 mm on a tip side of the projecting portion.

[3] The honeycomb structure according to the above [1] or [2], wherein in the partition walls arranged to define the cells, the number of the projecting portions to be disposed per side constituting a peripheral edge of the cell is 3 or less.

[4] The honeycomb structure according to any one of the above [1] to [3], wherein the specific projecting portions are disposed in the whole region of the honeycomb structure body.

A honeycomb structure of the present invention has projecting portions arranged to project into cells, and hence, a geometric surface area of partition walls can be increased by the projecting portions. In particular, the honeycomb structure of the present invention effectively utilizes a loaded catalyst, and has a suitable purification performance, and inhibits increase of pressure loss.

DESCRIPTION OF THE PREFERRED EMBODIMENTS

Hereinafter, description will specifically be made as to embodiments of the present invention with reference to the drawings. The present invention is not limited to the following embodiments. It should be understood that the following embodiments to which changes, improvements and the like are suitably added on the basis of ordinary knowledge of a person skilled in the art without departing from the gist of the present invention also fall in the scope of the present invention.

(1) Honeycomb Structure:

An embodiment of a honeycomb structure of the present invention is a honeycomb structure 100 shown in FIG. 1 to FIG. 4. The honeycomb structure 100 includes a pillar-shaped honeycomb structure body 10. The honeycomb structure body 10 has porous partition walls 1 arranged to define a plurality of cells 2 extending from a first end face 11 to a second end face 12 to form through channels for a fluid, and a circumferential wall 20 disposed to surround the partition walls 1. The partition walls 1 have projecting portions 21 projecting to extend into the cells 2 and arranged continuously in an extending direction of the cells 2.

In the honeycomb structure 100, the projecting portions 21 include specific projecting portions 21a. In the specific projecting portions 21a, side surfaces 21x have a divergent shape inclined to surfaces 1x of the partition walls 1 at an inclination angle of 40 to 70°. In the honeycomb structure 100, a hydraulic diameter A of each cell 2 and a height H of each specific projecting portion 21a satisfy a relation of $0.04 \leq H/A \leq 0.40$. Furthermore, in the specific projecting portion 21a, the hydraulic diameter A of the cell 2 and a height $H_1$ of a hem 23 that is a portion having the divergent shape satisfy a relation of $0.04 \leq H_1/A \leq 0.38$. In the honeycomb structure 100, the height H of the specific projecting portion 21a and the height $H_1$ of the hem 23 satisfy a relation of $H_1 < H$. Then, in the honeycomb structure 100, a ratio of a total number of the specific projecting portions 21a to a total number of all the projecting portions 21 is 2.5% or more. Hereinafter, the cells 2 having the specific projecting portions 21a will occasionally be referred to as "specific cells 2a".

The honeycomb structure 100 has the projecting portions 21 disposed to project into the cells 2, and hence, it is possible to increase a geometric surface area of the partition walls 1.

In particular, the honeycomb structure 100 has the specific projecting portions 21a, and hence, the structure effectively utilizes a loaded catalyst and has a suitable purification performance. Specifically, in the case of the projecting portions having a quadrangular cross section, when the catalyst is loaded, a lot of catalyst accumulates in roots of the projecting portions (i.e., catalyst accumulation occurs), and the catalyst of a lower layer portion (i.e., a portion closer to the root of the projecting portion) of this catalyst accumulation is hard to come in contact with an exhaust gas and hard to be effectively used. In such a situation, the catalyst is wasted due to the loading of the catalyst which is hard to be used. To eliminate such a problem, the specific projecting portions 21a are disposed, so that the catalyst is effectively utilizable. Therefore, when the catalyst is effectively utilized, the suitable purification performance of the catalyst is exerted. Furthermore, the projecting portions 21 (i.e., the specific projecting portions 21a) satisfying predetermined conditions are disposed, so that it is possible to inhibit increase of pressure loss.

(1-1) Partition Wall:

In the honeycomb structure 100, the partition walls 1 have the projecting portions 21 as described above. Consequently, when the catalyst is loaded onto the honeycomb structure 100, by the increase amount of area of the projecting portions 21 a catalyst loading area of the honeycomb structure 100 in which the projecting portions 21 are disposed is larger than that of a honeycomb structure in which the projecting portions 21 are not disposed. As a result, contact properties of the catalyst with the exhaust gas improve, and the purification performance of the exhaust gas improves.

The projecting portions 21 include the specific projecting portions 21a in which the side surfaces 21x of the projecting portions 21 have a shape (i.e., a divergent shape) inclined to the surfaces 1x of the partition walls 1 at the inclination angle of 40 to 70°. That is, in the specific projecting portion 21a, the inclination angle in the hem 23 is from 40 to 70°.

In the specific projecting portion 21a, it is further preferable that the inclination angle of the divergent shape is from 40 to 65°. When the inclination angle is in the above range, the catalyst is hard to thickly accumulate in the root of the projecting portion during catalyst coating, a surface area coated with the catalyst can increase, and the purification performance of the exhaust gas improves. When the inclination angle is less than the above lower limit and when heights of the hems of the specific projecting portions are adjusted to be the same while changing their angles, a volume of the specific projecting portions (especially, a volume of the hems) increases. Therefore, a heat capacity of the honeycomb structure increases, much time is therefore required until the catalyst reaches its activation temperature, and there is the fear that the purification performance of the exhaust gas deteriorates. When the inclination angle is in excess of the above upper limit, a lot of catalyst accumulates in the roots of the specific projecting portions during catalyst coating, and there is the fear that "the catalyst accumulation" occurs. In other words, there is the tendency that a thick layer of the catalyst is formed in the roots of the specific projecting portions. Then, as a result of the occurrence of "the catalyst accumulation", there is the fear that the catalyst of the lower layer portion of this catalyst layer (the portion closer to the root of the specific projecting portion) is not effectively used.

The above inclination angle θ of the specific projecting portion 21a is measured as follows. Specifically, a straight line T1 parallel to a bottom side (a plane F (see FIG. 3 and FIG. 4) extended from the surface 1x of the partition wall 1) is initially drawn at a position of ½ of the height $H_1$ of the hem 23 of the specific projecting portion 21a. Afterward, an intersection point K of the straight line T1 with the side surface 21x of the specific projecting portion 21a is obtained. Then, a tangent line to the side surface 21x at the intersection point K is drawn, and an angle formed by the tangent line and the bottom side F is obtained as the inclination angle θ. It is to be noted that the inclination angle θ is an acute angle in the angles formed by the surface 1x of the partition wall 1 and the side surface 21x of the projecting portion 21.

Here, in the present description, "the height $H_1$ of the hem" is a value measured as follows. That is, in a cross section perpendicular to the extending direction of the cells 2, an inscribed circle which comes in contact with the plane F and each side surface 21x of the specific projecting portion 21a is initially drawn on an inner side of the specific projecting portion 21a. Next, a vertical line S is drawn to the plane F from an intersection point $A_0$ of this inscribed circle with each side surface 21x of the specific projecting portion 21a (see FIG. 4), and a length of the vertical line S is obtained as "the height $H_1$ of the hem". It is to be noted that when the length of the vertical line S varies in one specific projecting portion 21a, the longer length is obtained as "the height $H_1$ of the hem". Furthermore, the hem 23 of the specific projecting portion 21a is a portion on an outer side from the vertical line S.

Furthermore, the specific projecting portion 21a is the projecting portion 21 having a shape (i.e., the divergent shape) inclined at the predetermined inclination angle θ, and "has the divergent shape". In other words, it can be considered that the specific projecting portion has the following relation. That is, when a straight line T2 is drawn through the respective intersection points $A_0$ of the inscribed circle with the respective side surfaces 21x of the specific projecting portion 21a, in parallel with the plane F (see FIG. 4), an angle formed by the straight line T2 and the side surface 21x of the specific projecting portion 21a is obtained as a main body angle $θ_1$. At this time, the inclination angle θ of the hem 23 of the specific projecting portion 21a is a value which is smaller than the main body angle $θ_1$. That is, for example, in a projecting portion having an isosceles triangular cross section, the inclination angle θ of the hem of the specific projecting portion has the same value as in the main body angle $θ_1$, and hence, the projecting portion does not correspond to the specific projecting portion 21a.

In the specific projecting portion 21a, the hydraulic diameter A of the cell 2 and the height $H_1$ of the hem 23 that is the portion having the divergent shape have a relation of $0.04 \leq H_1/A \leq 0.40$ and preferably $0.04 \leq H_1/A \leq 0.33$. When the height $H_1$ of the hem 23 and the hydraulic diameter A of the cell 2 satisfy the above relation, it is possible to inhibit the increase of the pressure loss. When a ratio of the relation is less than the lower limit, a sufficient purification performance is not exerted. Furthermore, when the ratio is in excess of the upper limit, the pressure loss excessively increases.

The height H of each of the projecting portions 21 (including the specific projecting portions 21a) and the hydraulic diameter A of the cell 2 satisfy a relation of $0.04 \leq H/A \leq 0.40$ and preferably satisfy a relation of $0.04 \leq H/A \leq 0.35$. When the height H of the projecting portion 21 and the hydraulic diameter A of the cell 2 satisfy the above relation, it is possible to inhibit the increase of the pressure loss. When a ratio of the relation is less than the lower limit, the sufficient purification performance is not exerted. Furthermore, when the ratio is in excess of the upper limit, the pressure loss excessively increases.

It is to be noted that the height H of the specific projecting portion 21a and the height $H_1$ of the hem 23 satisfy the relation of $H_1 < H$. More specifically, it is preferable that a ratio of the height $H_1$ of the hem 23 to the height H of the specific projecting portion 21a (i.e., a numerical formula: the height $H_1$ of the hem 23/the height H of the specific projecting portion 21a×100) is from 10 to 95%. When the ratio is in such a range and the height $H_1$ of the hem 23 and the height H of the projecting portion satisfy the above relation, it is possible to improve the purification performance, and it is also possible to inhibit the increase of the pressure loss.

In the honeycomb structure 100, the ratio of the total number of the specific projecting portions 21a to the total number of all the projecting portions 21 in the honeycomb structure body 10 is from 2.5 to 100% and preferably from 12.5 to 100%. When the ratio is in such a range, a suitable purification performance is obtainable. When the above ratio is less than 2.5%, the purification performance of the exhaust gas in the honeycomb structure onto which the catalyst is loaded is not sufficiently obtainable.

It is to be noted that the hydraulic diameter A of the cell is a value calculated by 4×(a sectional area)/(a peripheral length) on the basis of the sectional area and peripheral length of each cell. The sectional area of the cell indicates an area of a shape (a sectional shape) of the cell which appears in a cross section of the honeycomb structure which is vertical to a central axis direction, and the peripheral length of the cell indicates a length of a periphery of the sectional shape of the cell (a length of a closed line which surrounds the cross section).

Figure 6:
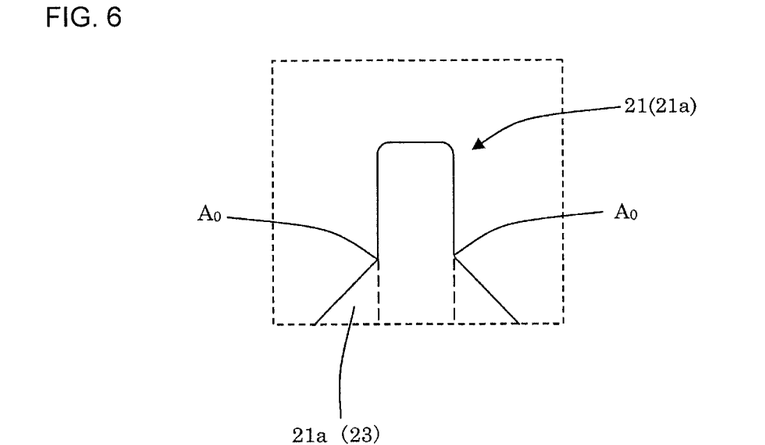
FIG. 6 is a plan view schematically showing an enlarged specific projecting portion in still another embodiment of the honeycomb structure of the present invention.

It is preferable that the projecting portion 21 includes a corner having a curvature radius R of 0.01 to 0.1 mm on a tip side of the projecting portion 21. In this case, the catalyst is more suitably loaded onto the surfaces of the projecting portions 21, and hence, there is the advantage that the purification performance of the exhaust gas further improves. When the curvature radius R is less than the above lower limit, the catalyst is not sufficiently loaded onto the tips of the projecting portions 21, and there is the fear that the purification performance of the exhaust gas does not sufficiently improve. When the curvature radius R is in excess of the above upper limit, there is the tendency that the heat capacity of the honeycomb structure increases. Therefore, much time is required until the catalyst reaches its activation temperature, and there is the fear that the purification performance of the exhaust gas deteriorates. FIG. 6 shows an example where the corner having the curvature radius R is formed on the tip side of the projecting portion 21 (the specific projecting portion 21a).

In a preferable configuration, the specific projecting portions 21a are disposed in a central portion of the honeycomb structure body 10 which excludes a circumferential portion of a region of 5 mm from a circumference of the honeycomb structure body 10. When the specific projecting portions 21a are disposed in the central portion of the honeycomb structure body 10 in this manner, it is possible to inhibit the increase of the pressure loss while improving the purification performance of the exhaust gas. "The central portion of the honeycomb structure body 10" is a region excluding the circumferential portion of the region of 5 mm from the circumference of the honeycomb structure body 10. In other words, it is preferable that the specific projecting portions 21a are disposed only in the above central portion and are not disposed in the circumferential portion that is the region of 5 mm from the circumference of the honeycomb structure body 10. It is to be noted that in the present configuration, there are not any special restrictions on the specific projecting portions 21a as long as the specific projecting portions are disposed in the above central portion, and the specific projecting portion may be disposed in the whole central portion or a part of the central portion.

Furthermore, in another preferable configuration, the specific projecting portions 21a are disposed in the whole region of the honeycomb structure body 10 (i.e., a region of the circumferential portion combined with the central portion). In other words, it is preferable that the specific projecting portions 21a are disposed in all the cells of the whole region of the honeycomb structure body 10. When the specific projecting portions 21a are disposed in this manner, the catalyst is more effectively utilized, and the purification performance of the exhaust gas in the honeycomb structure onto which the catalyst is loaded further improves.

Figure 4:
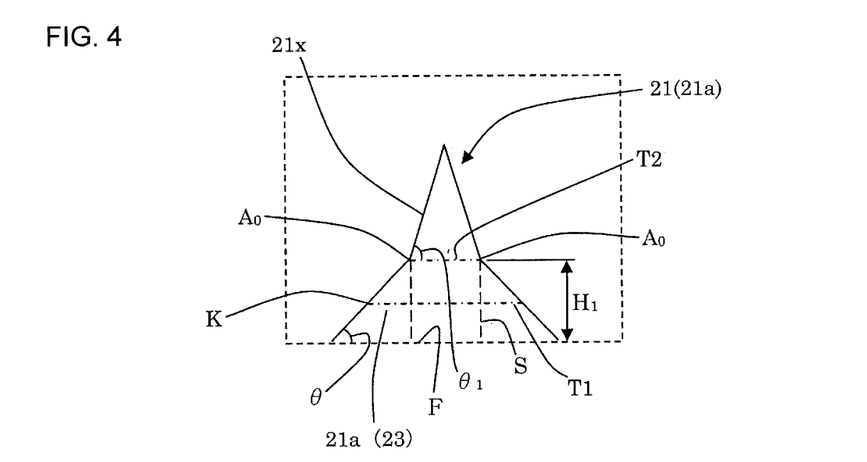
FIG. 4 is a plan view schematically showing an enlarged specific projecting portion in FIG. 3.
Figure 7:
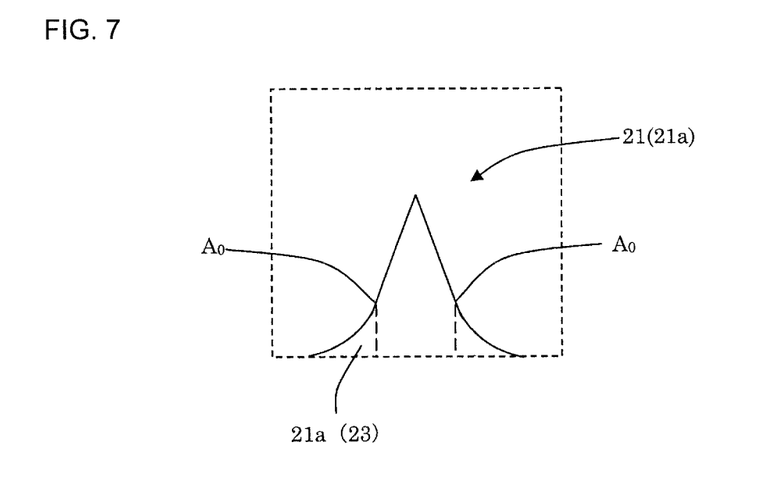
FIG. 7 is a plan view schematically showing an enlarged specific projecting portion in a further embodiment of the honeycomb structure of the present invention.

There are not any special restrictions on a shape of the projecting portion 21 in the cross section perpendicular to the cell extending direction. Examples of the shape include polygonal shapes such as a triangular shape and a quadrangular shape, and a semicircular shape. It is to be noted that as to the specific projecting portion 21a, a drawn figure extended as it is from the side surface 21x of an upper portion from the hem 23 corresponds to the above shape. FIG. 4 and FIG. 7 show examples where the projecting portions 21 are triangular, and FIG. 5, FIG. 6 and FIG. 8 show examples where the projecting portions 21 are quadrangular.

Figure 5:
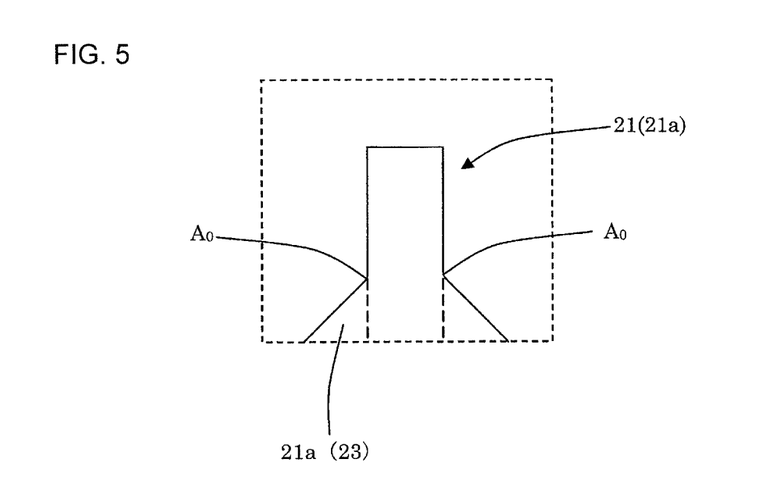
FIG. 5 is a plan view schematically showing an enlarged specific projecting portion in another embodiment of the honeycomb structure of the present invention.
Figure 8:
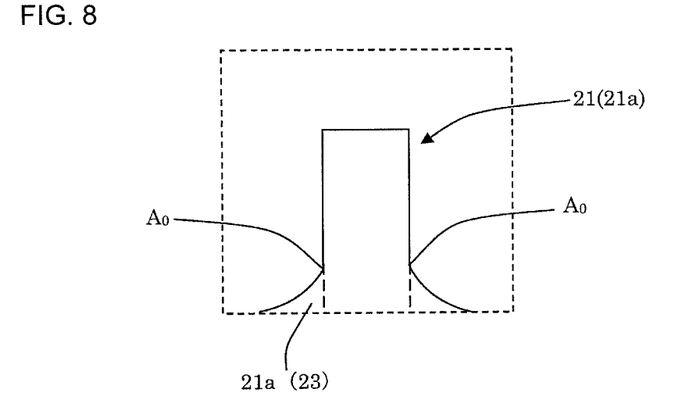
FIG. 8 is a plan view schematically showing an enlarged specific projecting portion in a still further embodiment of the honeycomb structure of the present invention.

The side surface 21x of the hem 23 of the specific projecting portion 21a may be linear (planar) as shown in FIG. 4 to FIG. 6, or may be curved (a curved surface) as shown in FIG. 7 and FIG. 8.

It is to be noted that as to a position, a shape, a height, an angle and the like of the projecting portion 21, an optional specific cell is observed with an image measuring instrument, and confirmed in the cross section perpendicular to the extending direction of the cells 2. It is to be noted that, for example, when the cell has the quadrangular sectional shape, a side positioned on a lower side in a screen of "the image measuring instrument" is defined as a first side α, a side positioned on a left side is defined as a second side β, a side positioned on an upper side is defined as a third side γ, and a side positioned on a right side is defined as a fourth side σ (see FIG. 3). It is to be noted that an example of the image measuring instrument is "a compact CNC image measuring system Quick Vision Elf QV ELF" manufactured by Mitutoyo Corporation.

There are not any special restrictions on the number of the projecting portions 21, and an optional number of the projecting portions may be disposed on the respective sides. The number of the projecting portions 21 may be the same or different on the sides. However, it is preferable that the number of the projecting portions 21 is the same on the sides. In this case, an erosion resistance is maintained. That is, when the number of the projecting portions 21 varies with each side, strength of the partition walls 1 might deteriorate in the side in which the number of the projecting portions 21 is small. On the other hand, when the number of the projecting portions 21 is the same on the sides as described above, it is possible to prevent the deterioration of the strength of the partition walls 1.

Specifically, it is preferable that the number of the projecting portions 21 to be disposed on each side is 3 or less. That is, it is preferable that in the partition walls 1 arranged to define the cells 2, the number of the projecting portions 21 to be disposed per side constituting a peripheral edge of the cell 2 is 3 or less. In this case, the exhaust gas further suitably flows through a space between the projecting portions 21 adjacent to each other, stagnation hardly occurs in the flow of the exhaust gas, and this number is effective from a viewpoint of improving the purification performance. When the number of the projecting portions 21 on each side is 4 or more, the space between the adjacent projecting portions 21 is excessively small, and there is the tendency that the pressure loss increases.

Figure 1:
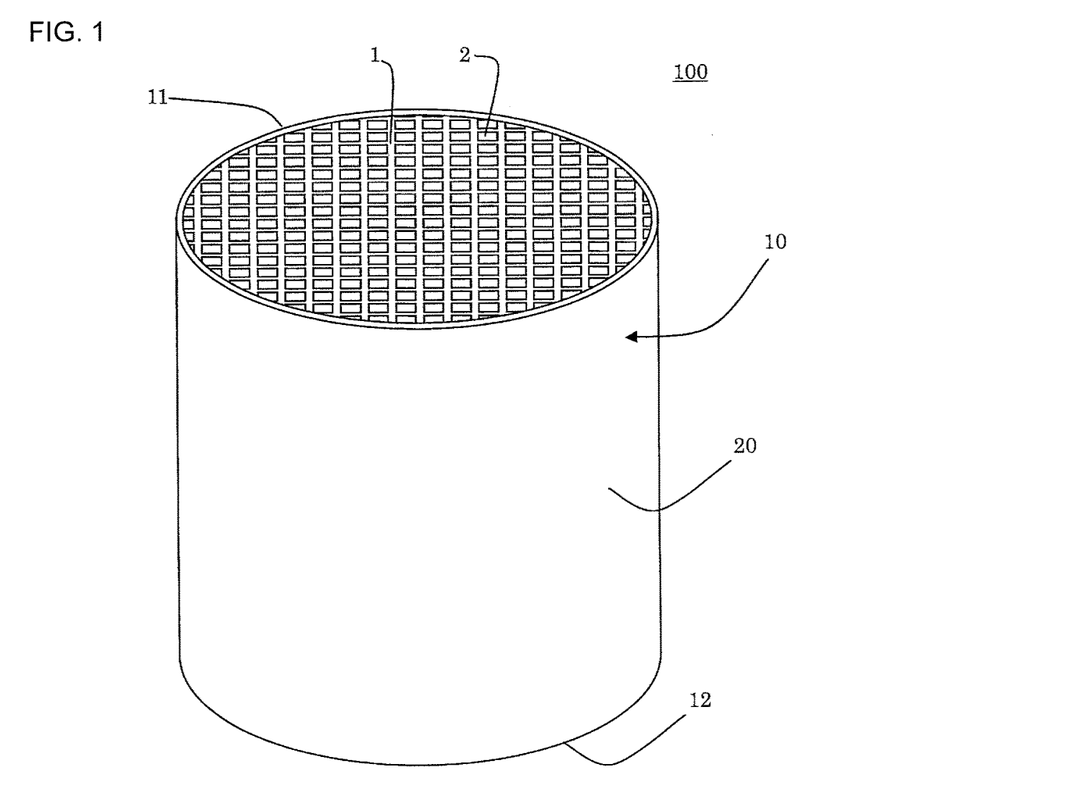
FIG. 1 is a perspective view schematically showing an embodiment of a honeycomb structure of the present invention.
Figure 2:
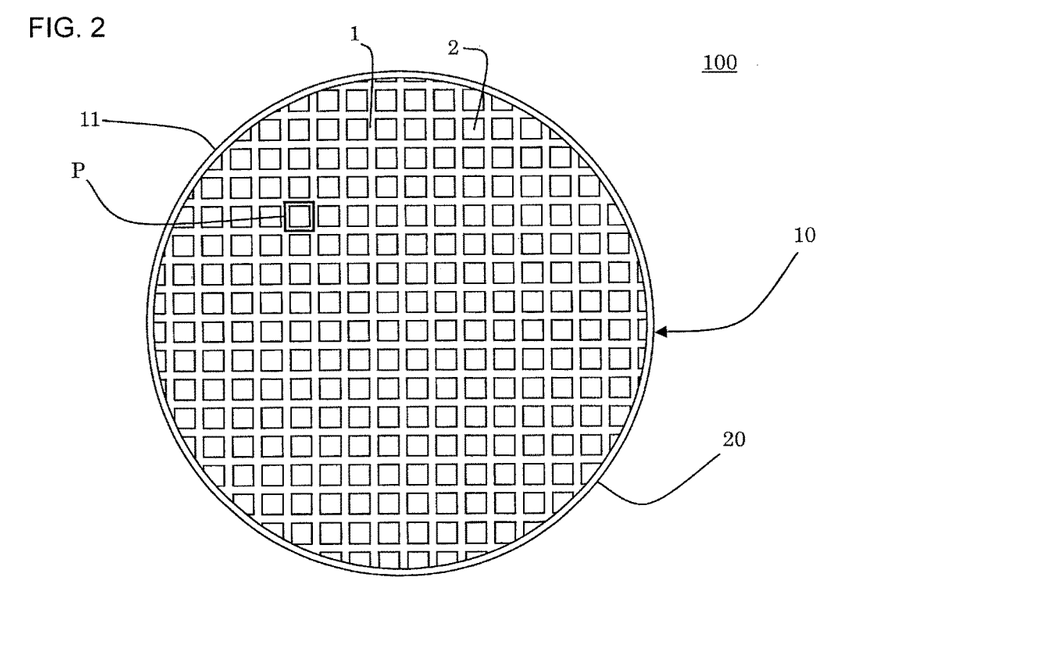
FIG. 2 is a plan view schematically showing an inflow end face of the embodiment of the honeycomb structure of the present invention.
Figure 3:
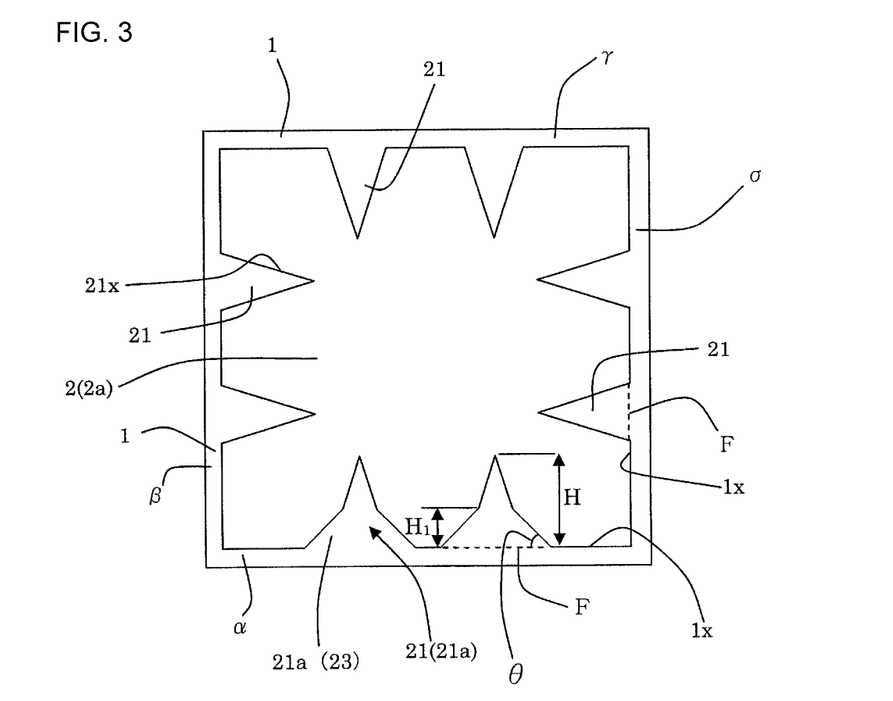
FIG. 3 is a plan view schematically showing an enlarged part (a region P) of the inflow end face shown in FIG. 2.

FIG. 3 shows an example where the number of the projecting portions 21 (including the specific projecting portions 21a) to be disposed on each side is 2. FIG. 3 shows the example where the number of the projecting portions 21 is "the same on the sides".

There are not any special restrictions on a position at which the projecting portion 21 is to be formed. Specifically, the projecting portion 21 may be disposed to project from the surface 1x of the partition wall 1, or may be disposed in an intersecting region where the partition walls 1 of two sides constituting the peripheral edge of the cell 2 intersect. Furthermore, both of the projecting portions may be disposed. Here, in the case of disposing the same number of the projecting portions 21 in one cell 2, when at least one projecting portion 21 is disposed in the above intersecting region, it is possible to inhibit the increase of the pressure loss more than when the projecting portions 21 are not disposed in the above intersecting region.

A thickness of the partition walls 1 is preferably from 0.040 to 0.230 mm and further preferably from 0.040 to 0.178 mm. When the thickness of the partition walls 1 is less than the lower limit, there is the fear that a mechanical strength runs short. When the thickness of the partition walls 1 is in excess of the upper limit, there is the fear that the pressure loss of the honeycomb structure 100 rises. It is to be noted that the thickness of the partition walls 1 is a value obtained by measuring a thickness of a portion in which the projecting portions 21 are not disposed.

There are not any special restrictions on a material of the partition walls 1. For example, it is preferable that the material contains ceramic as a main component. Specifically, it is preferable that the material is at least one selected from the group consisting of silicon carbide, a silicon-silicon carbide based composite material, cordierite, mullite, alumina, aluminum titanate, silicon nitride, and a silicon carbide-cordierite based composite material.

In the cross section of the honeycomb structure 100 which is perpendicular to the cell extending direction, examples of a shape of the cell include a quadrangular shape, and additionally, polygonal shapes such as a triangular shape, a pentagonal shape, a hexagonal shape and an octagonal shape, and any combination of the quadrangular shape with the hexagonal shape, the octagonal shape or the like. It is to be noted that in the present description, "the polygonal shape" is a concept of the shape of the cell 2 including a shape which conforms to the polygonal shape. Furthermore, "the shape of the cell 2" is defined as a shape in a state where the projecting portions 21 are not disposed. The projecting portion 21 is a portion cut by the plane F (see FIG. 3) extended from the surface 1x of the partition wall 1.

In the honeycomb structure 100, a ratio of the total number of the specific cells 2a to the total number of the cells 2 (the ratio calculated by a numerical formula: (the number of the specific cells 2a/the number of all the cells 2)×100) is preferably from 10 to 100% and further preferably from 50 to 100%. In this case, when the ratio of the specific cells 2a in all the cells 2 is in the above range, more suitable exhaust gas purification performance is exerted. When the ratio of the specific cells 2a in all the cells 2 is less than the above lower limit, the purification performance of the exhaust gas does not sufficiently improve, and there is the fear that the purification performance runs short.

In the honeycomb structure 100, it is preferable that a ratio of the total number of the specific projecting portions 21a to be disposed in one specific cell 2a to the total number of the projecting portions 21 to be disposed in the specific cell 2a (a ratio calculated by a numerical formula: (the total number of the specific projecting portions 21a/the total number of the projecting portions 21)×100) is from 25 to 100%. Then, it is further preferable that the above ratio is from 50 to 100%. In this case, more suitable exhaust gas purification performance is exerted in the honeycomb structure onto which the catalyst is loaded. When the above ratio is less than the above lower limit, the purification performance of the exhaust gas does not sufficiently improve, and there is the fear that the purification performance runs short. It is to be noted that the above ratio is an average value of the ratios of all the specific cells.

(1-2) Circumferential Wall:

The circumferential wall 20 is a wall disposed to surround the partition walls 1. The circumferential wall 20 may be formed monolithically with the partition walls 1.

A thickness of the circumferential wall 20 is preferably from 0.1 to 6.0 mm and especially preferably from 0.1 to 3.0 mm. When the thickness of the circumferential wall 20 is less than the lower limit, the mechanical strength might deteriorate. When the thickness is in excess of the upper limit, a large space to store the honeycomb structure 100 has to be acquired.

A cell density of the honeycomb structure 100 is preferably from 31 to 155 cells/cm$^2$ and especially preferably from 43 to 148 cells/cm$^2$. When the cell density is less than the lower limit, there is the fear that the strength cannot be kept. When the cell density is in excess of the upper limit, there is the fear that the pressure loss of the honeycomb structure 100 rises.

(2) Manufacturing Method of Honeycomb Structure:

The honeycomb structure of the present invention can be manufactured by a method having a honeycomb forming step and a firing step. Hereinafter, description will be made as to each step.

(2-1) Honeycomb Forming Step:

In the present step, a ceramic forming raw material containing a ceramic raw material is formed, to form a honeycomb formed body having partition walls arranged to define a plurality of cells which form through channels for a fluid.

It is preferable that the ceramic raw material contained in the ceramic forming raw material is at least one selected from the group consisting of a cordierite forming raw material, cordierite, silicon carbide, a silicon-silicon carbide based composite material, mullite, and aluminum titanate. It is to be noted that the cordierite forming raw material is a ceramic raw material blended to obtain a chemical composition in which silica falls in a range of 42 to 56 mass %, alumina falls in a range of 30 to 45 mass %, and magnesia falls in a range of 12 to 16 mass %. Then, the cordierite forming raw material is fired to form cordierite.

Furthermore, the ceramic forming raw material can be prepared by mixing the above ceramic raw material with a dispersing medium, an organic binder, an inorganic binder, a pore former, a surfactant and the like. There are not any special restrictions on a composition ratio of each raw material, and it is preferable to set a composition ratio in accordance with a structure, a material and the like of the honeycomb structure to be prepared.

In the case of forming the ceramic forming raw material, the ceramic forming raw material is initially kneaded to obtain a kneaded material, and the obtained kneaded material is formed in a honeycomb shape. An example of a method of kneading the ceramic raw material to form the kneaded material can include a method of using a kneader, a vacuum pugmill or the like. As a method of forming the kneaded material to obtain a honeycomb formed body, for example, a known forming method such as an extrusion molding or an injection molding is usable.

Specifically, a suitable example of the method can include a method of extruding the material by use of a die to form the honeycomb formed body. As a material of the die, cemented carbide which is hard to be worn is preferable.

It is preferable to use the die prepared as follows. That is, there is initially prepared a die (a conventional die) for use in preparing a heretofore known honeycomb structure which does not have any fins. Afterward, there are formed regions which are complementary to projecting portions (including specific projecting portions) (the regions into which the kneaded material enters to form the projecting portions (including the specific projecting portions), from slits of this conventional die (gaps to constitute partition walls) toward the outside by a discharge processing. In this way, a predetermined die can be prepared.

By use of such a die, it is possible to simply prepare the honeycomb formed body having projecting portions and specific projecting portions which satisfy conditions of the honeycomb structure of the present invention.

There are not any special restrictions on a shape of the honeycomb formed body, and examples of the shape include a round pillar shape, an elliptic pillar shape, and a polygonal prismatic columnar shape in which each end face has "a square shape, a rectangular shape, a triangular shape, a pentagonal shape, a hexagonal shape, an octagonal shape or the like".

Furthermore, the obtained honeycomb formed body can be dried after the honeycomb formed body is formed as described above. There are not any special restrictions on a drying method. Examples of the drying method can include a hot air drying, a microwave drying, an induction heating, drying under a reduced pressure, a vacuum drying, and a freeze drying. Among these examples, it is preferable to perform one or any combination of the induction drying, the microwave drying and the hot air drying.

(2-2) Firing Step:

Next, the honeycomb formed body is fired to prepare a honeycomb fired body. The firing of the honeycomb formed body (main firing) is perfotiiied for the purpose of sintering and densifying the forming raw material constituting a calcinated honeycomb formed body and acquiring a predetermined strength. Firing conditions (a temperature, a time, atmosphere and the like) vary in accordance with a type of forming raw material, and hence, appropriate conditions may be selected in accordance with the type. For example, when the cordierite forming raw material is used, it is preferable that a firing temperature is from 1410 to 1440° C. Furthermore, it is preferable that the firing time is from 4 to 8 hours as a time to keep the highest temperature. As a device which performs calcinating and main firing, an electric furnace, a gas furnace or the like is usable. The honeycomb fired body obtained as described above can be the honeycomb structure of the present invention. It is to be noted that the manufacturing method of the honeycomb structure may further has a circumference coating step as follows.

(2-3) Circumference Coating Step:

In the present step, a circumference of the obtained honeycomb fired body is coated with a circumference coating material to form a circumferential wall. It is to be noted that the circumferential wall may be formed monolithically with the partition walls during the preparation of the honeycomb formed body. The circumferential wall is further formed in the circumference coating step, so that it is possible to prevent the honeycomb structure from being chipped when an external force is applied to the honeycomb structure.

An example of the circumference coating material can include a material obtained by adding additives such as an organic binder, a foamable resin and a dispersing agent to inorganic raw materials such as inorganic fibers, colloidal silica, clay and SiC particles, and adding water to the materials to knead the materials. An example of a coating method with the circumference coating material can include a method of coating "the cut honeycomb fired body" with the material by use of a rubber spatula or the like while rotating the cut honeycomb fired body on a potter's wheel.

EXAMPLES

Hereinafter, the present invention will further specifically be described with reference to examples, but the present invention is not limited to these examples.

Example 1

In Example 1, a forming raw material to prepare a honeycomb structure was initially prepared. Specifically, a binder, a surfactant, a pore former and water were added to a ceramic raw material to obtain a forming raw material. Additionally, as the ceramic raw material, cordierite forming raw materials such as kaolin, talc and alumina were used.

Next, the obtained forming raw material was kneaded with a kneader and then kneaded with a vacuum pugmill, to prepare a kneaded material. Then, the obtained kneaded material was extruded by using a die, to prepare a honeycomb formed body. There was used the die to form the honeycomb formed body having projecting portions (including specific projecting portions). The honeycomb formed body was prepared so that a thickness of partition walls was 0.089 mm and a cell density was 62 cells/cm$^2$ after the honeycomb formed body was fired. A shape of each cell of the honeycomb formed body (the shape of the cell in a cross section perpendicular to an extending direction of the cells) was quadrangular. The honeycomb formed body had a round pillar shape. A diameter of each end face of the round pillar-shaped honeycomb formed body was 118.4 mm after the honeycomb formed body was fired. Additionally, the above die was designed so that the honeycomb structure to be prepared satisfied respective conditions shown in Table 1 to Table 3.

Afterward, the honeycomb formed body was dried, to obtain a honeycomb dried body. During the drying, an induction drying was initially performed, and then, a hot air drying was performed with hot air at a temperature of 120° C. for 2 hours. Next, both end portions of the honeycomb dried body were cut.

Next, the obtained honeycomb dried body was degreased. The degreasing was performed at 450° C. for 5 hours. Then, the degreased honeycomb dried body was fired, to obtain a honeycomb fired body. The firing was performed at 1425° C. in the atmospheric air for 7 hours. Additionally, a temperature was raised from 1200 to 1425° C. in 5 hours. In this way, the honeycomb structure of Example 1 was prepared.

In a cross section of the honeycomb structure of Example 1 which was perpendicular to a cell extending direction, an inclination angle θ of a hem of each specific projecting portion was 45°. Furthermore, a curvature radius R (a tip curvature radius R) of each corner of each of projecting portions was 0.025 mm. Furthermore, a height H of each of the projecting portions (including the specific projecting portions) was 0.18 mm and a height $H_1$ of the hem of the specific projecting portion was 0.11 mm. Furthermore, a hydraulic diameter A of each cell was 1.18 mm, and a value of a ratio (H/A) of the height H of the projecting portion to the hydraulic diameter A of the cell was 0.15. Additionally, as to the projecting portions in the cross section perpendicular to the cell extending direction, as shown in Table 2 and Table 3, only projecting portions of a side 1 (a first side α (see FIG. 3)) were the specific projecting portions. Additionally, the height $H_1$ of the hem of the specific projecting portion was obtained as follows. Initially, in the cross section perpendicular to the extending direction of the cells, there was drawn an inscribed circle which came in contact with a plane F (a bottom side F (see FIG. 3)) and each side surface of the specific projecting portion, on an inner side of the specific projecting portion. Next, a vertical line was drawn to the plane F from an intersection point $A_0$ of this inscribed circle with each side surface of the specific projecting portion, and a length of this vertical line was obtained as "the height $H_1$ of the hem". The obtained honeycomb structure had the same shape as an inverted shape of the shape of the above die.

Additionally, the inclination angle θ of the hem of the specific projecting portion and the height H of each of the projecting portions (including the specific projecting portions) were measured by using an image measuring instrument ("a compact CNC image measuring system Quick Vision Elf QV ELF" manufactured by Mitutoyo Corporation) and an image analysis software ("QVPAC" manufactured by Mitutoyo Corporation). Furthermore, positions of the projecting portions on the partition walls were confirmed. Specifically, the inclination angle of the hem of the specific projecting portion and the height H of the projecting portion were measured with the above image measuring instrument.

As to the inclination angle of the hem of the specific projecting portion, a straight line parallel to the bottom side F (see FIG. 3) was initially drawn at a position of ½ of the height $H_1$ of the hem of the specific projecting portion, and an intersection point K of the straight line with the side surface of the specific projecting portion was obtained. Then, a tangent line to the side surface at the intersection point K was drawn, and an angle formed by the tangent line and the bottom side F was obtained as the inclination angle θ of the hem of the specific projecting portion. Additionally, a main body angle $θ_1$ was 75°. The main body angle $θ_1$ is an angle formed by a straight line and the side surface of the specific projecting portion, when this straight line is drawn through respective intersection points $A_0$ of the above predetermined inscribed circle in the specific projecting portion with the respective side surfaces of the specific projecting portion, in parallel with the plane F (see FIG. 3).

Furthermore, a ratio of the total number of specific cells to the total number of cells (the ratio calculated by a numerical formula: (the number of the specific cells/the number of all the cells)×100) was 100% (each of Table 2 and Table 3 shows this ratio in a column of "the ratio (%) of the specific cells to all the cells"). Additionally, in a method of calculating the above ratio of the total number of the specific cells, the specific cells and the other cells were confirmed, and the total number of the specific cells and the total number of the cells other than the specific cells were counted, by use of the above image measuring instrument and the above image analysis software. Then, from these values, there was calculated the ratio of the total number of the specific cells to the total number of the cells of the honeycomb structure (a sum of the total number of the specific cells and the total number of the cells other than the specific cells).

Additionally, all the specific cells had the same shape. Then, a ratio of the total number of the specific projecting portions to be disposed in one specific cell to the total number of the projecting portions to be disposed in the specific cell (a ratio calculated by a numerical formula: (the total number of the specific projecting portions/the total number of the projecting portions)×100) was 25%. Each of Table 2 and Table 3 shows this ratio in a column of "the ratio (%) of the specific projecting portions per specific cell". This ratio was calculated as follows. Initially, the ratio of the number of the specific projecting portion disposed in the specific cell was confirmed. For example, when two projecting portions were formed in each of four sides of the specific cell having a quadrangular cross section and the specific projecting portion was formed only in one of the sides (the first side α), the ratio was calculated as in 2 specific projecting portions/8 projecting portions=0.25. Afterward, an average value in all the specific cells was calculated. Furthermore, the ratio of the total number of the specific projecting portions to the total number of all the projecting portions in the honeycomb structure was 25% (each of Table 2 and Table 3 shows this ratio in a column of "the ratio of the specific projecting portions to the projecting portions").

As to the honeycomb structure of Example 1, a partition wall thickness (mm), a porosity (%) of partition walls and a cell density (cells/cm$^2$) were measured by the following methods. The partition wall thickness (mm) and the cell density (cells/cm$^2$) were measured by using the above image measuring instrument and the image analysis software, and the porosity (%) of the partition walls was measured by a mercury porosimetry. Table 1 shows the result. Table 1 shows "the porosity (%) of the partition walls" as "the porosity (%)".

Table 1 shows the number of the projecting portions (including the specific projecting portions) arranged on each side (each of the first side α to a fourth side σ (see FIG. 3)) of the cell in the column of "the number (N) of the projecting portions per side". Furthermore, in Table 1, "the whole region" in the column of "the region where the projecting portions are arranged" indicates "the whole region of a honeycomb structure body", and this "whole region of the honeycomb structure body" means the whole region in each end face of the honeycomb structure.

(LA-4 Test)

As to the prepared honeycomb structure, a test based on LA-4 mode of US federal test procedure was carried out as follows. Initially, a catalyst (a three-way catalyst) was loaded as much as 200 g/L onto the partition walls of the honeycomb structure. Then, an aging treatment of the honeycomb structure onto which the catalyst was loaded was carried out at 950° C. for 12 hours by use of an electric furnace. Next, the honeycomb structure onto which the catalyst was loaded was mounted at a position under a floor of a vehicle having a displacement of 2400 cc, to carry out a LA-4 test. In the LA-4 test, a direct modal mass of each exhaust gas component was measured by using an exhaust gas measuring device (model No. "MEXA-7400" manufactured by HORIBA, Ltd.). Furthermore, an amount of HC to be emitted as a typical exhaust gas component was measured.

Additionally, in the honeycomb structure including the partition walls having the projecting portions, an amount of an exhaust gas to be emitted at a second peak from acceleration especially increases. Consequently, a ratio of a

TABLE 1

| | Partition wall thickness (mm) | Cell density (cells/cm$^2$) | Porosity (%) | Dia. (mm) | No. of projecting portions per side (N) (projecting portions) | Inclination angle of hem (°) | Tip curvature radius R (mm) | Region where projecting portions are arranged |
|---|---|---|---|---|---|---|---|---|
| Comparative Example 1 | 0.089 | 62 | 35 | 118.4 | 3 | 45 | 0.025 | — |
| Comparative Example 2 | 0.089 | 62 | 35 | 118.4 | 3 | 45 | 0.025 | Whole region |
| Example 1 | 0.089 | 62 | 35 | 118.4 | 3 | 45 | 0.025 | Whole region |
| Example 2 | 0.089 | 62 | 35 | 118.4 | 3 | 45 | 0.025 | Whole region |
| Example 3 | 0.089 | 62 | 35 | 118.4 | 3 | 45 | 0.025 | Whole region |
| Example 4 | 0.089 | 62 | 35 | 118.4 | 3 | 45 | 0.025 | Whole region |
| Example 5 | 0.089 | 62 | 35 | 118.4 | 3 | 45 | 0.025 | Whole region |
| Example 6 | 0.089 | 62 | 35 | 118.4 | 3 | 45 | 0.025 | Whole region |
| Example 7 | 0.089 | 62 | 35 | 118.4 | 3 | 45 | 0.025 | Whole region |
| Comparative Example 3 | 0.089 | 62 | 35 | 118.4 | 3 | 37 | 0.025 | Whole region |
| Example 8 | 0.089 | 62 | 35 | 118.4 | 3 | 40 | 0.025 | Whole region |
| Example 9 | 0.089 | 62 | 35 | 118.4 | 3 | 61 | 0.025 | Whole region |
| Example 10 | 0.089 | 62 | 35 | 118.4 | 3 | 70 | 0.025 | Whole region |
| Comparative Example 4 | 0.089 | 62 | 35 | 118.4 | 3 | 73 | 0.025 | Whole region |
| Comparative Example 5 | 0.089 | 62 | 35 | 118.4 | 3 | 45 | 0.025 | Whole region |
| Example 11 | 0.089 | 62 | 35 | 118.4 | 3 | 45 | 0.025 | Whole region |
| Example 12 | 0.089 | 62 | 35 | 118.4 | 3 | 45 | 0.025 | Whole region |
| Comparative Example 6 | 0.089 | 62 | 35 | 118.4 | 3 | 45 | 0.025 | Whole region |
| Example 13 | 0.089 | 62 | 35 | 118.4 | 3 | 45 | 0.025 | Whole region |
| Example 14 | 0.089 | 62 | 35 | 118.4 | 3 | 45 | 0.008 | Whole region |
| Example 15 | 0.089 | 62 | 35 | 118.4 | 3 | 45 | 0.014 | Whole region |
| Example 16 | 0.089 | 62 | 35 | 118.4 | 3 | 45 | 0.100 | Whole region |
| Example 17 | 0.089 | 62 | 35 | 118.4 | 3 | 45 | 0.110 | Whole region | modal mass integrated value between start of the acceleration at the second peak and end of the acceleration at the second peak was calculated, and an increase (%) of the amount of HC to be emitted before and after the second peak from the acceleration was obtained. Table 4 shows the result.

It is to be noted that when each of Table 2 and Table 3 shows, for example, "the cells in which the specific projecting portions are disposed are present in 5% of all the cells", it is meant that the specific projecting portions are disposed in the cells of 5% of all the cells. That is, it is indicated that a ratio of specific cells in all the cells is 5%.

When it is shown that "only projecting portions of side 1 are the specific projecting portions" in a column of "arrangement rule 2", it is indicated that the projecting portions on "the side 1 (the first side α)" of all the sides (the first side α to the fourth side σ (see FIG. 3)) are only the specific projecting portions, and the projecting portions on the other sides (the second side β to the fourth side σ) are the projecting portions other than the specific projecting portions. Furthermore, when "the projecting portions of sides 1 and 2 are only the specific projecting portions", it is indicated that the projecting portions on "the side 1 (the first side α)" and "the side 2 (the second side β)" of all the sides are only the specific projecting portions, and the projecting portions on the other sides (the third side γ and the fourth side σ) are the projecting portions other than the specific projecting portions. Additionally, when "the projecting portions of the sides 1, 2 and 3 are only the specific projecting portions", it is indicated that the projecting portions on "the side 1 (the first side α)", "the side 2 (the second side β)" and "the side 3 (the third side γ)" of all the sides are only the specific projecting portions, and the projecting portions on the other side (the fourth side σ) are the projecting portions other than the specific projecting portions.

In a column of "an increase of an amount of HC to be emitted before and after a second peak in LA-4", the table shows "the increase of the amount of HC to be emitted before and after the second peak from the acceleration".

TABLE 2

| | | Arrangement rule 1 | | Arrangement rule 2 | | Ratio of specific projecting portions to projecting portions (%) | $H/A$ (—) | $H_1/A$ (—) | $H_1/H$ (%) |
|---|---|---|---|---|---|---|---|---|---|
| | Arrangement state 1 | Ratio (%) of specific cells to all cells | Arrangement state 2 | Ratio (%) of specific projecting portions per specific cell | | | | | |
| Comparative Example 1 | All cells are not cells in which specific projecting portions are disposed | 0 | Specific projecting portions are not disposed in cells | 0 | 0 | 0.15 | 0.09 | 61 |
| Comparative Example 2 | In 5% of all cells, cells are present in which specific projecting portions are disposed | 5 | Only projecting portion of side 1 is specific projecting portion | 25 | 1.25 | 0.15 | 0.09 | 61 |
| Example 1 | All cells are cells in which specific projecting portions are disposed | 100 | Only projecting portion of side 1 is specific projecting portion | 25 | 25 | 0.15 | 0.09 | 61 |
| Example 2 | All cells are cells in which specific projecting portions are disposed | 100 | Only projecting portions of sides 1 and 2 are specific projecting portions | 50 | 50 | 0.15 | 0.09 | 61 |
| Example 3 | All cells are cells in which specific projecting portions are disposed | 100 | Only projecting portions of sides 1, 2 and 3 are specific projecting portions | 75 | 75 | 0.15 | 0.09 | 61 |
| Example 4 | All cells are cells in which specific projecting portions are disposed | 100 | All projecting portions are specific projecting portions | 100 | 100 | 0.15 | 0.09 | 61 |
| Example 5 | In 50% of all cells, cells are present in which specific projecting portions are disposed | 50 | Only projecting portion of side 1 is specific projecting portion | 25 | 12.5 | 0.15 | 0.09 | 61 |
| Example 6 | In 45% of all cells, cells are present in which specific projecting portions are disposed | 45 | Only projecting portion of side 1 is specific projecting portion | 25 | 11.25 | 0.15 | 0.09 | 61 |
| Example 7 | In 10% of all cells, cells are present in which specific projecting portions are disposed | 10 | Only projecting portion of side 1 is specific projecting portion | 25 | 2.5 | 0.15 | 0.09 | 61 |
| Comparative Example 3 | In 10% of all cells, cells are present in which specific projecting portions are disposed | 10 | Only projecting portion of side 1 is specific projecting portion | 25 | 2.5 | 0.15 | 0.09 | 61 |
| Example 8 | In 10% of all cells, cells are present in which specific projecting portions are disposed | 10 | Only projecting portion of side 1 is specific projecting portion | 25 | 2.5 | 0.15 | 0.09 | 61 |

TABLE 2-continued

| | Arrangement rule 1 | | Arrangement rule 2 | | Ratio of specific projecting portions to projecting portions (%) | H/A (—) | $H_1/A$ (—) | $H_1/H$ (%) |
|---|---|---|---|---|---|---|---|---|
| | Arrangement state 1 | Ratio (%) of specific cells to all cells | Arrangement state 2 | Ratio (%) of specific projecting portions per specific cell | | | | |
| Example 9 | In 10% of all cells, cells are present in which specific projecting portions are disposed | 10 | Only projecting portion of side 1 is specific projecting portion | 25 | 2.5 | 0.15 | 0.09 | 61 |
| Example 10 | In 10% of all cells, cells are present in which specific projecting portions are disposed | 10 | Only projecting portion of side 1 is specific projecting portion | 25 | 2.5 | 0.15 | 0.09 | 61 |
| Comparative Example 4 | In 10% of all cells, cells are present in which specific projecting portions are disposed | 10 | Only projecting portion of side 1 is specific projecting portion | 25 | 2.5 | 0.15 | 0.09 | 61 |

TABLE 3

| | Arrangement rule 1 | | Arrangement rule 2 | | Ratio of specific projecting portions to projecting portions (%) | H/A (—) | $H_1/A$ (—) | $H_1/H$ (%) |
|---|---|---|---|---|---|---|---|---|
| | Arrangement state 1 | Ratio (%) of specific cells to all cells | Arrangement state 2 | Ratio (%) of specific projecting portions per specific cell | | | | |
| Comparative Example 5 | In 10% of all cells, cells are present in which specific projecting portions are disposed | 10 | Only projecting portion of side 1 is specific projecting portion | 25 | 2.5 | 0.03 | 0.03 | 75 |
| Example 11 | In 10% of all cells, cells are present in which specific projecting portions are disposed | 10 | Only projecting portion of side 1 is specific projecting portion | 25 | 2.5 | 0.35 | 0.31 | 90 |
| Example 12 | In 10% of all cells, cells are present in which specific projecting portions are disposed | 10 | Only projecting portion of side 1 is specific projecting portion | 25 | 2.5 | 0.39 | 0.36 | 93 |
| Comparative Example 6 | In 10% of all cells, cells are present in which specific projecting portions are disposed | 10 | Only projecting portion of side 1 is specific projecting portion | 25 | 2.5 | 0.44 | 0.41 | 92 |
| Example 13 | In 10% of all cells, cells are present in which specific projecting portions are disposed | 10 | Only projecting portion of side 1 is specific projecting portion | 25 | 2.5 | 0.40 | 0.04 | 11 |
| Example 14 | In 10% of all cells, cells are present in which specific projecting portions are disposed | 10 | Only projecting portion of side 1 is specific projecting portion | 25 | 2.5 | 0.40 | 0.04 | 11 |
| Example 15 | In 10% of all cells, cells are present in which specific projecting portions are disposed | 10 | Only projecting portion of side 1 is specific projecting portion | 25 | 2.5 | 0.40 | 0.04 | 11 |
| Example 16 | In 10% of all cells, cells are present in which specific projecting portions are disposed | 10 | Only projecting portion of side 1 is specific projecting portion | 25 | 2.5 | 0.40 | 0.04 | 11 |

TABLE 3-continued

| | Arrangement rule 1 | | Arrangement rule 2 | | Ratio of specific projecting portions to projecting portions (%) | H/A (—) | $H_1$/A (—) | $H_1$/H (%) |
|---|---|---|---|---|---|---|---|---|
| | Arrangement state 1 | Ratio (%) of specific cells to all cells | Arrangement state 2 | Ratio (%) of specific projecting portions per specific cell | | | | |
| Example 17 | In 10% of all cells, cells are present in which specific projecting portions are disposed | 10 | Only projecting portion of side 1 is specific projecting portion | 25 | 2.5 | 0.40 | 0.04 | 11 |

TABLE 4

| | Increase of amount of HC to be emitted before and after second peak in LA-4 | | Pressure loss | | | General judgment |
|---|---|---|---|---|---|---|
| | (%) | Judgment | Pressure loss [kPa] | Ratio of pressure loss to standard structure | Judgment | |
| Comparative Example 1 | 38 | Failure | 2.10 | Standard structure | — | — |
| Comparative Example 2 | 37 | Failure | 2.11 | 1.00 | OK | Failure |
| Example 1 | 29 | Excellent | 2.20 | 1.04 | OK | Excellent |
| Example 2 | 26 | Excellent | 2.30 | 1.09 | OK | Excellent |
| Example 3 | 25 | Excellent | 2.40 | 1.14 | OK | Excellent |
| Example 4 | 24 | Excellent | 2.50 | 1.19 | OK | Excellent |
| Example 5 | 31 | Excellent | 2.15 | 1.02 | OK | Excellent |
| Example 6 | 33 | Good | 2.15 | 1.02 | OK | Good |
| Example 7 | 34 | Good | 2.11 | 1.00 | OK | Good |
| Comparative Example 3 | 37 | Failure | 2.12 | 1.00 | OK | Failure |
| Example 8 | 35 | Good | 2.12 | 1.00 | OK | Good |
| Example 9 | 34 | Good | 2.11 | 1.00 | OK | Good |
| Example 10 | 35 | Good | 2.12 | 1.00 | OK | Good |
| Comparative Example 4 | 37 | Failure | 2.12 | 1.00 | OK | Failure |
| Comparative Example 5 | 37 | Failure | 2.11 | 1.00 | OK | Failure |
| Example 11 | 33 | Good | 2.50 | 1.19 | OK | Good |
| Example 12 | 33 | Good | 2.71 | 1.28 | OK | Good |
| Comparative Example 6 | 32 | Excellent | 2.81 | 1.33 | NG | Failure |
| Example 13 | 35 | Good | 2.30 | 1.09 | OK | Good |
| Example 14 | 36 | Passable | 2.30 | 1.09 | OK | Passable |
| Example 15 | 35 | Good | 2.30 | 1.09 | OK | Good |
| Example 16 | 35 | Good | 2.45 | 1.16 | OK | Good |
| Example 17 | 36 | Passable | 2.45 | 1.16 | OK | Passable |

(Judgment of LA-4 Test)

The increase (%) of the amount of HC to be emitted before and after the second peak from the acceleration needs to be 36% or less so that the honeycomb structure in which the partition walls have the projecting portions is more advantageous in a bag emission than "a honeycomb structure in which the partition walls do not have the projecting portions". Consequently, the LA-4 test was judged on the basis of the following criteria.

Judgment "excellent": A case where the increase of the amount of HC to be emitted is 32% or less is judged to be "excellent".

Judgment "good": A case where the increase of the amount of HC to be emitted is 35% or less and in excess of 32% is judged to be "good".

Judgment "passable": A case where the increase of the amount of HC to be emitted is 36% or less and in excess of 35% is judged to be "passable".

Judgment "failure": A case where the increase of the amount of HC to be emitted is in excess of 36% is judged to be "failure".

(Judgment of Pressure Loss)

The pressure loss was measured on conditions at a temperature of 25° C., an atmospheric pressure of 1 atm and a gas flow rate of 10 $Nm^3$/min in a wind tunnel test device. The pressure loss was judged on the following criteria. It is to be noted that as to the pressure loss allowed in the honeycomb structure in which the partition walls have the projecting portions, a ratio of pressure loss to a standard structure (a value calculated by a numerical formula: the pressure loss of the honeycomb structure of each of the examples and comparative examples/the pressure loss of the standard structure (the honeycomb structure of Comparative Example 1)) needs to be 1.3 or less. Therefore, the following criteria are set.

Judgment "OK": A case where the ratio of the pressure loss to the standard structure (Comparative Example 1) is 1.3 or less is judged to be "OK".

Judgment "NG": A case where the ratio of the pressure loss to the standard structure (Comparative Example 1) is in excess of 1.3 is judged to be "NG".

(General Judgment)

General judgment was carried out in accordance with the following criteria on the basis of the judgment of LA-4 test and the judging of the pressure loss.

Judgment "excellent": A case where the judgment of the LA-4 test is "excellent" and the judgment of the pressure loss is "OK" is judged to be "excellent".

Judgment "good": A case where the judgment of the LA-4 test is "good" and the judgment of the pressure loss is "OK" is judged to be "good".

Judgment "passable": A case where the judgment of the LA-4 test is "passable" and the judgment of the pressure loss is "OK" is judged to be "passable".

Judgment "failure": A case where the judgment of the LA-4 test or the judgment of the pressure loss is "failure" or "NG" is judged to be "failure".

Examples 2 to 17 and Comparative Examples 1 to 6

The procedure of Example 1 was repeated except that projecting portions were arranged as shown in Table 1 to Table 3, to prepare honeycomb structures.

Also as to the honeycomb structures of Examples 2 to 17 and Comparative Examples 1 to 6, the procedure of Example 1 was repeated to measure a partition wall thickness (mm), a porosity (%) of partition walls and a cell density (cells/cm$^2$) and to carry out a LA-4 test and measure pressure loss. Table 1 to Table 4 show the results.

(Result)

As shown in Table 4, it is seen that in each of the honeycomb structures of Examples 1 to 17, a purification performance of an exhaust gas when an exhaust gas purifying catalyst is loaded improves and increase of pressure loss is inhibited, as compared with the honeycomb structures of Comparative Examples 1 to 6.

A honeycomb structure of the present invention is utilizable as an exhaust gas purifying catalyst carrier to purify an exhaust gas.

DESCRIPTION OF REFERENCE NUMERALS

1: partition wall, 1x: surface of the partition wall, 2: cell, 2a: specific cell, 10: honeycomb structure body, 11: first end face, 12: second end face, 20: circumferential wall, 21: projecting portion, 21a: specific projecting portion, 21x: side surface, 23: hem, F: plane (a bottom side), H: height of the projecting portion, $H_1$: height of the hem, α: first side, β: second side, γ: third side, σ: fourth side, θ: inclination angle, and $θ_1$: main body angle.

What is claimed is:

1. A honeycomb structure comprising a pillar-shaped honeycomb structure body having porous partition walls arranged to define a plurality of cells extending from a first end face to a second end face to form through channels for a fluid, and a circumferential wall disposed to surround the partition walls, wherein the partition walls have projecting portions projecting to extend into the cells and arranged continuously in an extending direction of the cells, the projecting portions include specific projecting portions in which side surfaces have a divergent shape inclined to the surfaces of the partition walls at an inclination angle of 40 to 70°, a hydraulic diameter A of each cell and a height H of each specific projecting portion satisfy a relation of 0.04≤H/A≤0.40, in the specific projecting portion, the hydraulic diameter A of the cell and a height $H_1$ of a hem that is a portion having the divergent shape satisfy a relation of 0.04≤$H_1$/A≤0.38, the height H of the specific projecting portion and the height $H_1$ of the hem satisfy a relation of $H_1$<H, and a ratio of a total number of the specific projecting portions to a total number of all the projecting portions in the honeycomb structure body is 2.5% or more.

2. The honeycomb structure according to claim 1, wherein the projecting portion includes a corner having a curvature radius R of 0.01 to 0.1 mm on a tip side of the projecting portion.

3. The honeycomb structure according to claim 1, wherein in the partition walls arranged to define the cells, the number of the projecting portions to be disposed per side constituting a peripheral edge of the cell is 3 or less.

4. The honeycomb structure according to claim 1, wherein the specific projecting portions are disposed in the whole region of the honeycomb structure body.

* * * * *